(12) United States Patent
Etemad et al.

(10) Patent No.: US 9,385,791 B2
(45) Date of Patent: Jul. 5, 2016

(54) SIGNALING FOR CONFIGURATION OF DOWNLINK COORDINATED MULTIPOINT COMMUNICATIONS

(75) Inventors: Kamran Etemad, Potomac, MD (US); Alexei Davydov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 223 days.

(21) Appl. No.: 13/996,150

(22) PCT Filed: Jun. 7, 2012

(86) PCT No.: PCT/US2012/041369
§ 371 (c)(1),
(2), (4) Date: Sep. 9, 2013

(87) PCT Pub. No.: WO2013/066416
PCT Pub. Date: May 10, 2013

(65) Prior Publication Data
US 2013/0343317 A1 Dec. 26, 2013

Related U.S. Application Data

(60) Provisional application No. 61/556,109, filed on Nov. 4, 2011, provisional application No. 61/591,641, filed on Jan. 27, 2012.

(51) Int. Cl.
*H04B 7/02* (2006.01)
*H04B 7/06* (2006.01)
(Continued)

(52) U.S. Cl.
CPC ............. *H04B 7/024* (2013.01); *H04B 7/0626* (2013.01); *H04L 1/007* (2013.01); *H04L 1/0026* (2013.01); *H04W 72/042* (2013.01)

(58) Field of Classification Search
None
See application file for complete search history.

(56) References Cited

U.S. PATENT DOCUMENTS

| 2010/0173660 A1* | 7/2010 | Liu | H04W 24/02 455/501 |
| 2010/0238821 A1* | 9/2010 | Liu | H04L 43/045 370/252 |

(Continued)

FOREIGN PATENT DOCUMENTS

| EP | 2733982 A1 | 5/2014 |
| JP | 2005094750 A | 4/2005 |

(Continued)

OTHER PUBLICATIONS

International Search Report and Written Opinion mailed Feb. 21, 2013 from International Application No. PCT/US2012/041369.

(Continued)

*Primary Examiner* — Kodzovi Acolatse
(74) *Attorney, Agent, or Firm* — Schwabe, Williamson & Wyatt, P.C.

(57) ABSTRACT

Embodiments of the present disclosure describe devices, methods, computer-readable media and systems configurations for configuration of downlink coordinated multi-point (CoMP) communications in a wireless communication network. A user equipment (UE) may receive channel state information (CSI) reference signal (RS) parameters, from an evolved Node B (eNB), for individual transmission points of a coordinated multi-point (CoMP) Measurement Set including a plurality of transmission points. The UE may generate CSI-RS feedback information for the individual transmission points of the CoMP Measurement Set, and may transmit the generated CSI-RS feedback information for one or more of the individual transmission points to the eNB. The UE may receive a transmission from the eNB updating the individual transmission points included in the CoMP Measurement Set.

18 Claims, 6 Drawing Sheets

(51) Int. Cl.
*H04L 1/00* (2006.01)
*H04W 72/04* (2009.01)

(56) References Cited

U.S. PATENT DOCUMENTS

| | | | |
|---|---|---|---|
| 2011/0034715 A1 | 2/2011 | Fong et al. | |
| 2011/0199986 A1* | 8/2011 | Fong et al. | .................... 370/329 |
| 2011/0237272 A1* | 9/2011 | Gorokhov | .............. H04B 7/024 |
| | | | 455/452.1 |
| 2012/0002635 A1* | 1/2012 | Chung | ................ H04W 76/048 |
| | | | 370/329 |
| 2013/0021925 A1* | 1/2013 | Yin | ........................ H04B 7/024 |
| | | | 370/252 |
| 2013/0077513 A1* | 3/2013 | Ng et al. | ....................... 370/252 |
| 2013/0077569 A1* | 3/2013 | Nam | ................... H04W 52/288 |
| | | | 370/328 |
| 2013/0088978 A1* | 4/2013 | Mondal et al. | ................. 370/252 |
| 2013/0258896 A1* | 10/2013 | Park | .................... H04W 72/085 |
| | | | 370/252 |

FOREIGN PATENT DOCUMENTS

| | | | |
|---|---|---|---|
| JP | 2009004924 A | | 1/2009 |
| JP | 2011142516 A | | 7/2011 |
| JP | 2011171837 A | | 9/2011 |
| KR | WO 2010/107221 | * | 9/2010 .............. H04B 7/26 |
| WO | WO2010/107945 A2 | | 9/2010 |
| WO | WO2011/136290 A1 | | 11/2011 |
| WO | WO2013/007207 A1 | | 1/2013 |
| WO | WO2013048121 A1 | | 4/2013 |

OTHER PUBLICATIONS

3GPP, "Technical Specification Group Radio Access Network; Coordinated multi-point operation for LTE physical layer aspects (Release 11)," 3GPP TR 36.819 V11.0.0, Sep. 2011, Lte Advanced, See section 5.1.4, 5.2.1-5.2.3.

Samsung, "Discussions on TP associations for CoMP," 3GPP TSG-RAN WG1#66bis meeting, R1-113092, Oct. 10-14, 2011, Zhuhai, China, See sections 2, 3; and fig. 5.

Panasonic, "CSI-RS based measurement for CoMP," 3GPP TSG RAN WG1 Meeting #66bis, R1-113123, Oct. 10-14, 2011, Zhuhai, China, See sections 1-3; and fig. 1.

Office Action mailed Jun. 2, 2015 for Japanese Application No. 2014-539928, 5 pages.

Extended European Search Report mailed Jun. 24, 2015 for European Application No. 12844820.6, 9 pages.

CATT: "Impact of CoMP on Control Plane", 3GPP Draft; R2-095488, 3rd Generation Partnership Project (3GPP), Mobile Competence Centre; 650 Route Des Lucioles; F-06921 Sophia-Antipolis Cedex; France, no. Miyazaki; Oct. 12, 2009, 6 pages.

Mediatek Inc: "Point Selection and CSI Feedback for CoMP Operation", 3GPP Draft; R1-113051_CSI Measurement_Feedback_Comp_R2, 3rd Generation Partnership Project (3GPP), Mobile Competence Centre; 650, Route Des Lucioles; F-06921 Sophia-Anitpolis Cedex; France, vol. RAN WG1, no. Zhuhai; Oct. 4, 2011, 4 pages.

Office Action issued Mar. 15, 2016 from Japanese Patent Application No. 2014-539928, 11 pages Catt, "Impact of CoMP on Control Plane," 3GPP TSG RAN WG2 Meeting #67, R2-094330, Agenda Item: 7.5, Aug. 24-28, 2009, Shenzhen, China, 8 pages.

Samsung, "Discussion on CoMP Resource Management procedure," 3GPP TSG-RAN WG2#78 meeting, R2-122739, Agenda Item: 7.8, May 21-25, 2012, Prague, Czech Republic, 7 pages.

Intel Corporation, "Downlink control signaling for DL CoMP," 3GPP TSG-RAN WG1#69, R1-122629, Agenda Item: 7.5.5, May 21-25, 2012, Prague, Czech, 6 pages.

Intel Corporation, "Clarifications and Design Requirements for CoMP Scenarios 1-3," TSG-RAN WG1 #64, R1-110973, Agenda Item: 6.3.1.2, Feb. 21-25, 2011, Taipei, Taiwan, 6 pages.

ZTE, "CSI-RS configurations for CoMP," 3GPP TSG RAN WG1 Meeting #67, R1-113762, Agenda Item: 7.5.2.1.2, Nov. 14-18, 2011, San Francisco, USA, 5 pages.

Panasonic, "CSI-RS configuration details," 3GPP TSG RAN WG1 Meeting #67, R1-113809, Agenda Item: 7.5.2.1.2 Downlink reference signals for CoMP; Configuration details; CSI-RS, Nov. 14-18, 2011, San Francisco, USA, 5 pages.

* cited by examiner

US 9,385,791 B2

SIGNALING FOR CONFIGURATION OF DOWNLINK COORDINATED MULTIPOINT COMMUNICATIONS

CROSS REFERENCE TO RELATED APPLICATIONS

The present application is a national phase entry under 35 U.S.C. §371 of International Application No. PCT/US2012/041369, filed Jun. 7, 2012, entitled "SIGNALING FOR CONFIGURATION OF DOWNLINK COORDINATED MULTIPOINT COMMUNICATIONS", which designates the United States of America, and which claims priority to U.S. Provisional Patent Application No. 61/556,109, filed Nov. 4, 2011, and U.S. Provisional Patent Application No. 61/591,641, filed Jan. 27, 2012, the entire contents and disclosures of which are hereby incorporated by reference in their entireties.

FIELD

Embodiments of the present invention relate generally to the field of communications, and more particularly, to signaling for downlink coordinated multipoint communications.

BACKGROUND

Coordinated multipoint (CoMP) systems have been developed in order to improve various operational parameters in wireless networks. There are three types of CoMP systems: joint transmission (JT); dynamic point selection (DPS); and cooperative scheduling and cooperative beamforming (CS/CB). In JT CoMP, both a serving point, e.g., an enhanced node base station (eNB), and a coordinating point, e.g., another eNB, may send the same data to a user equipment (UE). In DPS CoMP, a transmission point may be dynamically selected among different candidates, e.g., a macro-node eNB and a pico-node eNB. In CS/CB CoMP, coordinating nodes may suppress interference of interfering channels. Effective management of CoMP communications with a UE may require definition of various CoMP sets of transmission points. However, the UE may not provide sufficient feedback to allow the eNB to effectively determine the CoMP sets.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Illustrative embodiments of the present disclosure include, but are not limited to, methods, systems, and apparatuses for configuring downlink coordinated multi-point (CoMP) communications in a wireless communication network.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B". The phrase "at least one of A, B and C" means (A), (B), (C), (A and B), (A and C), (B and C) or (A, B and C). The phrase "(A) B" means (B) or (A and B), that is, A is optional.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
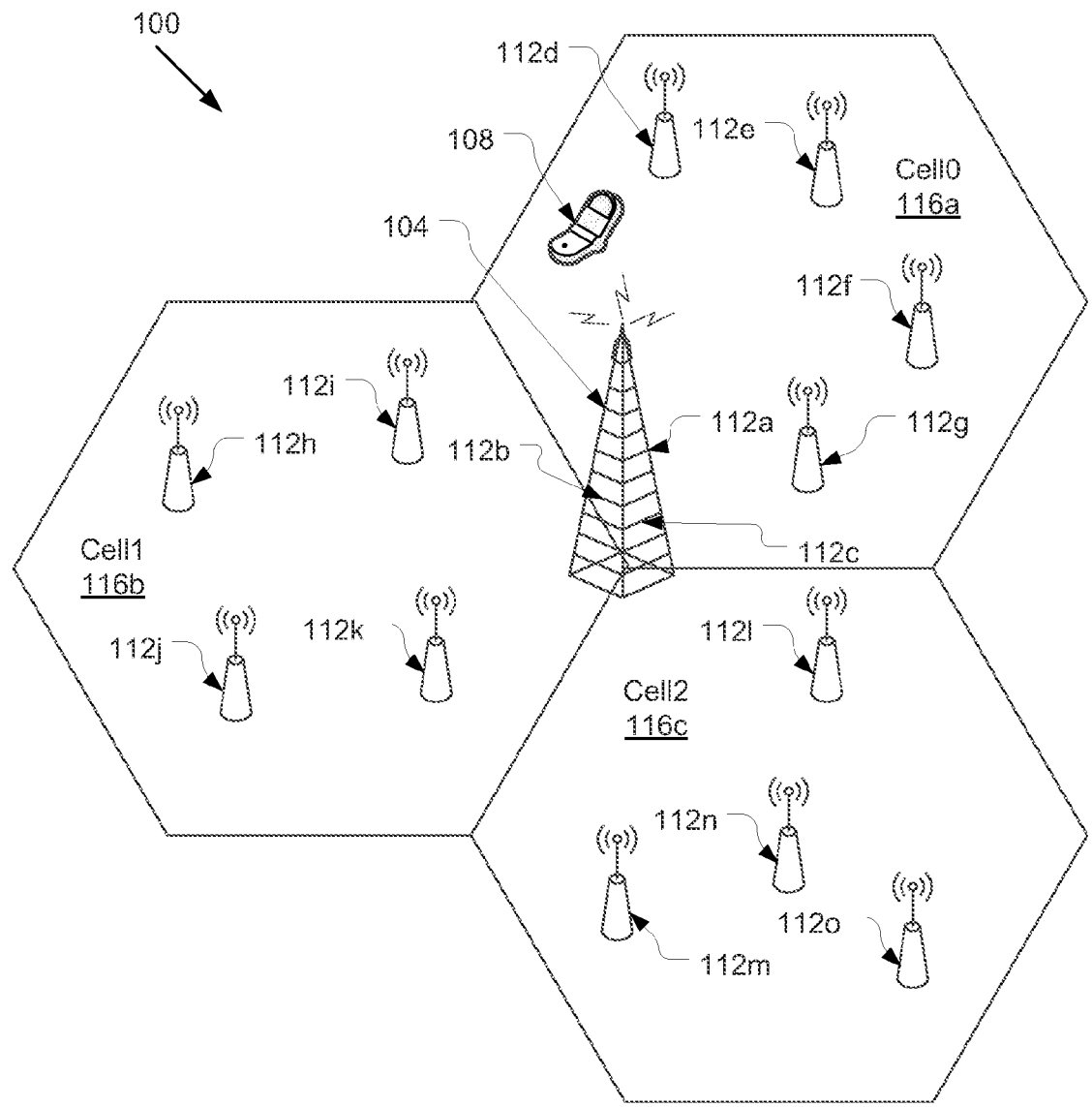
FIG. 1 schematically illustrates a wireless communication network in accordance with various embodiments.

FIG. 1 schematically illustrates a wireless communication network 100 in accordance with various embodiments. Wireless communication network 100 (hereinafter "network 100") may be an access network of a 3rd Generation Partnership Project (3GPP) long-term evolution (LTE) network such as evolved universal mobile telecommunication system (UMTS) terrestrial radio access network (E-UTRAN). The network 100 may include a base station, e.g., evolved Node B (eNB) 104, configured to wirelessly communicate with user equipment (UE) 108.

At least initially, the eNB 104 may have an established wireless connection with the UE 108 and may operate as a serving node for coordinated multi-point (CoMP) communications with the UE 108. The eNB 104 may include one or more transmission points 112a-c that service individual cells 116a-c of the network 100. For example, transmission point 112a may cover a first cell 116a, transmission point 112b may cover a second cell 116b, and transmission point 112c may cover a third cell 116c. In other embodiments, the eNB 104 may include only one transmission point and/or may only cover one cell. The network 100 may further include one or more additional transmission points 112d-o. The transmission points 112d-o may be remote radio heads (RRHs, also referred to as remote radio equipment (RRE)) and/or base stations (e.g., eNBs). In some embodiments, the transmission points 112d-o may transmit with a lower power than eNB 104. Transmission points 112d-o may be located in and/or associated with cells 116a-c as shown.

The transmission points 112d-o may be configured to facilitate wireless communication with the UE 108 through coordination with the eNB 104. The one or more additional transmission points 112d-o may be collectively referred to as "coordinating nodes." In some embodiments, a transmission point may transition between coordinating and serving node roles. The serving node and coordinating nodes may communicate with one another over a wireless connection and/or a wired connection (e.g., a high-speed fiber backhaul connection).

Figure 2:
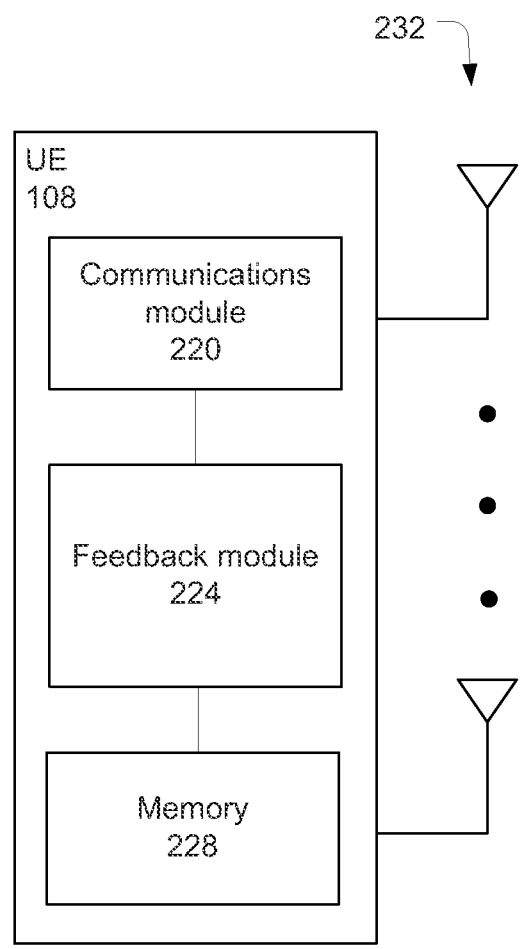
FIG. 2 is a block diagram illustrating a user equipment in accordance with various embodiments.

As shown in FIG. 2, the UE 108 may include a communications module 220, a feedback module 224, and memory 228 coupled with one another at least as shown. The communications module 220 may be further coupled with one or more of a plurality of antennas 232 of the UE 108 for communicating wirelessly over network 100.

The UE 108 may include any suitable number of antennas 232. In various embodiments, the UE 108 may include at least as many antennas 232 as a number of simultaneous spatial layers or streams received by the UE 108 from the transmission points 112a-o, although the scope of the present disclosure may not be limited in this respect. The number of simultaneous spatial layers or streams may also be referred to as transmission rank, or simply rank.

One or more of the antennas 232 may be alternately used as transmit or receive antennas. Alternatively, or additionally, one or more of the antennas 232 may be dedicated receive antennas or dedicated transmit antennas.

Figure 3:
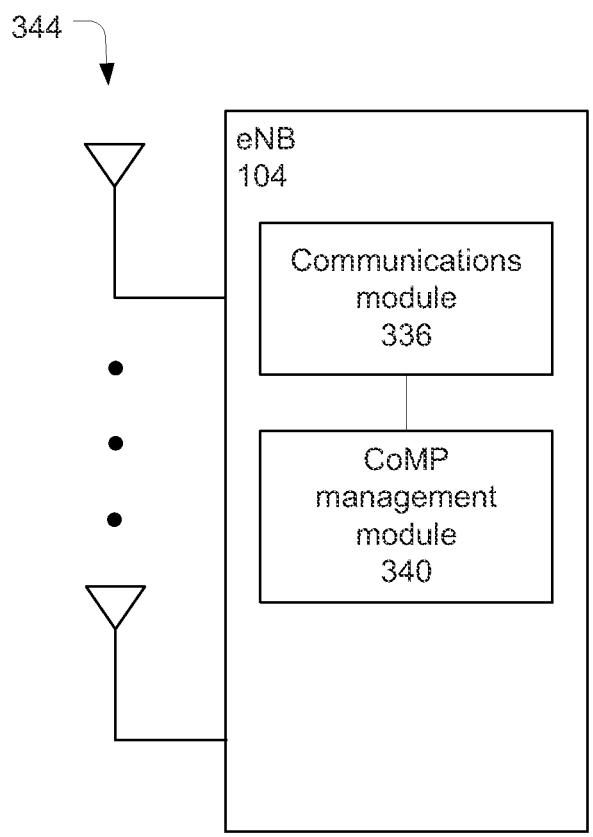
FIG. 3 is a block diagram illustrating a base station in accordance with various embodiments.

As shown in FIG. 3, eNB 104 may include a communications module 336 and a CoMP management module 340 coupled with one another at least as shown. The communications module 336 may be further coupled with one or more of a plurality of antennas 344 of the eNB 104. The communications module 336 may communicate (e.g., transmit and/or receive) with one or more UEs (e.g., UE 108). In various embodiments, the eNB 104 may include at least as many antennas 344 as a number of simultaneous transmission streams transmitted to the UE 108, although the scope of the present disclosure may not be limited in this respect. One or more of the antennas 344 may be alternately used as transmit or receive antennas. Alternatively, or additionally, one or more of the antennas 344 may be dedicated receive antennas or dedicated transmit antennas. Additionally, one or more of the antennas 344 may be associated with individual transmission points 112a-c (e.g., dedicated for communications within an individual cell 116a-c). Alternatively, or additionally, one or more of the antennas 344 may alternate between communicating in one or more cells 116a-c.

In some embodiments, one or more of transmission points 112d-o may have similar modules/components as eNB 104.

In various embodiments, the CoMP management module 340 of the eNB 104 may transmit channel state information (CSI) reference signal (RS) parameters to the UE 108 for individual transmission points of a CoMP Measurement Set including a plurality of transmission points (e.g., a plurality of the transmission points 112a-o). The UE 108 may receive the CSI-RS parameters, and the feedback module 224 of the UE 108 may generate fast CSI-RS feedback for the individual transmission points of the CoMP Measurement Set. The UE 108 may transmit the fast CSI-RS feedback information for one or more of the transmission points of the CoMP Measurement Set. The eNB 104 may select transmission points for a cooperating set and a scheduled transmission point set from the transmission points for which the eNB 104 receives the fast CSI-RS feedback information. The eNB 104 may dynamically update which transmission points are included in the CoMP Measurement Set. The eNB 104 may send a transmission to the UE 108 notifying the UE 108 of the configuration and/or updates to the CoMP Measurement Set. The UE 108 may then generate the fast CSI-RS feedback information for the transmission points of the updated CoMP Measurement Set.

In various embodiments, CoMP Measurement Set may be selected from a larger candidate measurement set including a plurality of transmission points (e.g., a plurality of the transmission points 112a-o). The CoMP management module 340 of eNB 104 may select the candidate measurement set including a plurality of the transmission points of the network 100. The transmission points of the candidate measurement set may be initial candidates for CoMP communications with the UE 108. The transmission points included in the candidate measurement set may be selected based on any suitable data, such as a cell in which the UE 108 is located and/or a proximity of the transmission points 112a-o to the UE 108. In some embodiments, the candidate measurement set may be cell-specific (e.g., may apply to all UEs within the same cell). However, in some embodiments, the candidate measurement set may be modified based on any other information the eNB has regarding the UE 108, such as transmission points located close to the UE 108.

In various embodiments, the CoMP management module 340 may receive candidate feedback information for individual transmission points of the candidate measurement set. The candidate feedback information may include long-term (e.g., average) common reference signal (CRS) feedback information, uplink sounding reference signal (SRS) feedback information, and/or long-term (e.g., average) CSI-RS feedback information. In some embodiments, different types of candidate feedback information may be obtained for different transmission points. For example, CSI-RS feedback information may be obtained for some of the transmission points, while CRS feedback information and/or SRS feedback information may be obtained for other transmission points. Additionally, or alternatively, more than one type of candidate feedback information may be obtained for individual transmission points (e.g., CRS feedback information, SRS feedback information, and CSI-RS feedback information).

In various embodiments, the feedback module 224 of the UE 108 may transmit signals to provide the candidate feedback information. For example, the signals may include CRS feedback information related to CRSs of individual transmission points, uplink SRSs, and/or CSI-RS feedback information related to CSI-RSs of individual transmission points. In the case of uplink SRSs, the SRSs may be received by the individual transmission points, and feedback information related to the SRSs (e.g., received signal strength) may be sent from the transmission point to the eNB 104.

In various embodiments, the eNB 104 may transmit, to the UE 108, CSI-RS parameters for individual transmission points of the candidate measurement set for which the eNB 104 is requesting long-term (e.g., radio resource management type) CSI-RS feedback information from the UE 108. These transmission points may be considered part of a CoMP Resource Management Set, which is a subset of the candidate measurement set. In some embodiments, the CoMP Resource Management Set and candidate measurement set may be the same (e.g., may include the same set of transmission points).

In some embodiments, the eNB 104 may transmit CSI-RS parameters for additional transmission points for which the eNB 104 is not requesting long-term CSI-RS feedback information. This signaling of the CSI-RS parameters may facilitate dynamic activation and/or deactivation of transmission points for inclusion in the CoMP Measurement Set, as further discussed below.

In some embodiments, existing mechanisms and signaling may be used for the UE 108 to provide the CRS feedback information and/or SRS signals. Accordingly, no additional signaling may be required to notify the UE 108 of the transmission points of the candidate measurement set for which the eNB 104 is to gather CRS feedback information and/or SRS feedback information. Alternatively, or additionally, the eNB 104 may transmit, to the UE 108, CoMP-specific configuration parameters for CRS feedback information and/or SRS signals.

In some cases, CRS feedback information may not be sufficient for the eNB 104 to manage CoMP communications for the UE 108. For example, in some cases, multiple transmission points within a cell (e.g., transmission points 112a and 112d-g in cell 116a) may be associated with the same Cell identifier (Cell ID). The CRS feedback information may be associated with the Cell ID, and thus may not be useful for the eNB 104 to distinguish between transmission points. In these embodiments, SRS feedback and/or long-term CSI-RS feedback may be used to provide feedback for the individual transmission points of the candidate measurement set.

In various embodiments, the CSI-RS parameters may be transmitted to the UE 108 via radio resource control (RRC) signaling. The CSI-RS parameters may include, for example, CSI-RS resource configuration parameters, zero-power CSI-RS configuration parameters, uplink control channel parameters, and/or a CSI feedback mode indicator. The CSI-RS resource configuration parameters may include, for example, a transmit power, a periodicity, a subframe offset, a scrambling code, an initialization seed, a number of antenna ports, and/or an index related to the individual transmission points of the CoMP Measurement Set. The zero-power CSI-RS configuration parameters may include conventional zero-power CSI-RS configuration parameters and/or zero-power CSI-RS configuration parameters for interference measurements.

In some embodiments, the CSI-RS parameters may be included in CoMP configuration parameters which may also include cell-specific parameters and/or a maximum number of transmission points (e.g., CSI-RS resources) for which CSI feedback will be reported (as explained below). The cell-specific parameters may include, for example, frame structure parameters, such as multicast-broadcast single frequency network (MBSFN) subframe indexes in radio frame, a number of antenna ports for common reference signals (CRSs), CRS frequency shift, a cell identifier, a number of symbols in a physical downlink control channel (PDCCH) transmitted by the cell, and/or positioning reference signal (PRS) parameters associated with individual cells (e.g., cells 116a-c).

The eNB 104 may assign an index to the individual transmission points for which the eNB 104 sends the CSI-RS parameters. The index may be included in the transmission of the CSI-RS parameters and/or assigned implicitly by the order of CSI-RS parameters included in the transmission. In some embodiments, the index may be a 3- or 4-bit index, although other quantities of bits may be used.

In various embodiments, the UE 108 may generate CSI-RS feedback information for the individual transmission points of the CoMP Resource Management Set based on the CSI-RS parameters received from the eNB 104. The UE 108 may transmit the CSI-RS feedback information to the eNB 104.

The eNB 104 may select a CoMP Measurement Set based on the candidate feedback information for the candidate CSI-RSs. As discussed above, the candidate feedback information may include the CSI-RS-based RRM measurements on the CoMP Resource Management Set and any CRS-based RRM measurements and/or uplink SRS measurements that are available for additional transmission points (and/or for the transmission points of the CoMP Resource Management Set). The CoMP Measurement Set includes the transmission points for which the UE 108 is to generate fast CSI-RS feedback on CSI-RSs of the transmission points. The CoMP Measurement Set may be UE-specific.

In some embodiments, the transmission points included in the CoMP Measurement Set may also be included in the CoMP Resource Management Set. In this case, the UE 108 may already have the CoMP configuration parameters for the CoMP Measurement Set. The eNB 104 may send a transmission to the UE 108 notifying the UE 108 of the transmission points included in the CoMP Measurement Set. In some embodiments, the transmission may be a medium access control layer control element (MAC-CE) transmission and/or an RRC transmission. The transmission may include the indexes of the individual transmission points (i.e., CSI-RS resources) included in the CoMP Measurement Set if the indexes have been previously configured (e.g., at RRC level). Alternatively, the indexes may be explicitly configured and/or reconfigured in the transmission defining the CoMP Measurement Set (e.g., in an RRC transmission).

In some embodiments, if CSI-RSs are configured with assigned indexes, the transmission may include a bitmap indicating the transmission points included in the CoMP Measurement Set. For example, the bitmap may be ordered according to the index of the transmission points, with a bit of a first value (e.g., a logic 1) indicating that the transmission point is included in the CoMP Measurement Set, and a bit of a second value (e.g., a logic 0) indicating that the transmission point is not included in the CoMP Measurement Set.

The feedback module 224 of the UE 108 may then reference the previously-received CoMP configuration parameters for the transmission points of the CoMP Measurement Set. For example, the feedback module 224 may retrieve the CoMP configuration parameters from memory 228.

In other embodiments, the CoMP Measurement Set may include transmission points for which the UE 108 does not yet have CoMP configuration parameters. In these embodiments, the eNB 104 may transmit the CoMP configuration parameters for those transmission points at this stage of the configuration process. The eNB 104 may also assign an index to these transmission points.

In various embodiments, the UE 108 may generate fast CSI-RS feedback information for the individual transmission points of the CoMP Measurement Set. The UE 108 may transmit the fast CSI-RS feedback to the eNB 104. In some embodiments, the number of transmission points within the CoMP Measurement Set for which the UE 108 reports the CSI-RS feedback to the eNB 104 may be further limited to a predetermined maximum number. In some embodiments, the maximum number may determined by the eNB 104 and may be included in the CSI-RS parameters transmitted to the UE 108 by the eNB 104. The UE 108 may select a number of transmission points of the CoMP Measurement Set based on the quality of respective transmissions (e.g., based on the generated CSI-RS feedback), wherein the number is less than or equal to the predetermined maximum number. The UE 108 may then transmit the fast CSI-RS feedback for those transmission points to the eNB 104. The transmission of the fast CSI-RS feedback may indicate the identity of the transmission points chosen for reporting by the UE 108 (e.g., based on the index of the transmission points).

In some embodiments, the UE 108 may send combined CSI-RS feedback for a plurality of transmission points in an uplink transmission. For example, the combined CSI-RS feedback information may be transmitted on a physical uplink shared channel (PUSCH). In some embodiments, the index of the transmission points for which CSI-RS feedback information is being reported may be included in the PUSCH transmission. Alternatively, the UE 108 may transmit CSI-RS feedback individually (e.g., in separate messages for each transmission point). For example, the CSI-RS feedback information for individual transmission points may be transmitted on a physical uplink control channel (PUCCH). In some embodiments, the messages including the CSI-RS feedback information for a plurality of transmission points may be multiplexed on the PUCCH according to the index of the transmission points.

In an alternative embodiment, the UE 108 may autonomously select the CoMP Measurement Set from the CoMP Resource Management Set. For example, the eNB 104 may include the maximum number in the CSI-RS parameters for the CoMP Resource Management Set. The UE 108 may then select up to the maximum number of transmission points of the CoMP Resource Management Set for which to report fast CSI-RS feedback information to the eNB 104. This approach may not require the eNB 104 to signal updates to the CoMP Measurement Set. However, the eNB 104 may not be able to further limit the transmission points of the CoMP measurement set, for example, based on traffic dynamics and/or imminent scheduling decisions across transmission points.

The eNB 104 may then select the cooperating set of one or more transmission points from the CoMP Measurement Set. The cooperating set may include the transmission points that cooperate for CoMP transmissions to the UE 108. The eNB 104 may determine the transmission points included in the cooperating set based on the fast CSI-RS feedback, other scheduling decisions, and/or other factors. The cooperating set may include one or more transmission points scheduled for transmission to the UE 108 on a physical downlink shared channel (PDSCH). Additionally, the cooperating set may include any transmission points scheduled to mute (e.g., not transmit) the PDSCH for the corresponding channel resources. In some embodiments, the identity of the cooperating set may not be transmitted to the UE 108, since the cooperating set may include transmission points which do not transmit to the UE 108 on the PDSCH.

In some embodiments, the eNB 104 may send a transmission to the UE 108 to notify the UE 108 of the transmission points scheduled for transmission to the UE 108 on the PDSCH. The transmission may be transmitted on a physical channel, such as the PDCCH. The UE 108 may need to be notified of the scheduled transmission points, for example, for some CoMP schemes such as dynamic point selection (DPS). In DPS CoMP, explicit signaling of the transmitting cell(s) and/or CSI-RS resource(s) may be needed to enable correct decoding of PDSCH (due to Cell ID dependent frequency shift for CRS, the order of PDSCH mapping within PRB may be different for different cells).

In some embodiments, a CoMP cell indication field (CSIF) may be used to notify the UE 108 of the one or more transmission points that are scheduled for transmission to the UE 108. For example, the CSIF may be included in a downlink control information (DCI) message sent to the UE on the PDCCH. The CSIF may use the same index configured for the CoMP Measurement Set to indicate which of the activated transmission points (e.g., cells and/or CSI-RS resources) are scheduled for transmission on the PDSCH.

In some embodiments, the CSIF may be a defined as a new, e.g. 2 bit, field in addition to a carrier aggregation (CA) cell indication field (CIF) field. Alternatively, the CSIF may be combined with the CA CIF. This can be realized reusing same 3 bits already provisioned in Release 10 of the Long Term Evolution (LTE) Standard, or a larger number of bits to allow more combination of cells in CoMP and CA. This combined CIF field can be interpreted by UE without confusion as cells configured for cross carrier scheduling for CA and those used for CoMP are both explicitly configured through RRC signaling. For example, if CSIF uses the same 3 bit field in PDCCH, provisioned for CIF in Release 10 carrier aggregations and only two carriers are configured for cross carrier scheduling with CIF the remaining 6 possibilities can be used to indicate cells/CSI-RSs used for CoMP as configured by the RRC signaling.

In other embodiments, the eNB 104 may not notify the UE 108 of the scheduled transmission points.

In various embodiments, the eNB 104 may dynamically update the transmission points included in the CoMP Measurement Set and send a transmission to the UE 108 to notify the UE 108 of the updated CoMP Measurement Set. The updating transmission may activate and/or deactivate transmission points for inclusion in the CoMP Measurement Set based on the index of the transmission point. For example, the updating transmission may include the same format and/or content as the transmission notifying the UE 108 of the initial CoMP Measurement Set.

The eNB 104 may update the transmission points included in the CoMP Measurement Set, for example, based on the fast CSI-RS feedback information reported by the UE 108 for the CoMP Measurement Set. For example, if a quality of the fast CSI-RS feedback for one or more of the reported transmission points is below a threshold, the eNB 104 may seek to add and/or replace another transmission point to the CoMP Measurement Set. The eNB 104 may choose other transmission points to include in the CoMP Measurement Set from the transmission points included in the candidate measurement set. The eNB 104 may receive ongoing (e.g., periodic) candidate feedback information for the candidate measurement set, and may base the decision on the candidate feedback information. Additionally, the eNB 104 may remove one or more transmission points from the CoMP Measurement Set based on the fast CSI-RS feedback information.

In some embodiments, the UE 108 may already have the CSI-RS parameters for the transmission points included in the updated CoMP Measurement Set. For example, the updated CoMP Measurement Set may include a subset of the transmission points in the CoMP Resource Management Set. In these embodiments, the eNB 104 may use a MAC transmission to efficiently notify the UE 108 of the transmission points included in the updated CoMP Measurement Set according to their indices. The UE 108 may use the CSI-RS parameters received earlier to generate the fast CSI-RS feedback information.

In other embodiments, the UE 108 may not have the CSI-RS parameters for one or more of the transmission points included in the updated CoMP Measurement Set, for example, if the transmission point was not included in the CoMP Resource Management Set and/or an CoMP Resource Management Set was not configured. In these embodiments, the eNB 104 may transmit the CSI-RS parameters and/or other CoMP configuration parameters to the UE 104 when updating the CoMP Measurement Set. The parameters may be sent, for example, by RRC signaling. This option requires less signaling up-front (e.g., for configuring the CoMP Resource Management Set), but more signaling when dynamically updating the CoMP Measurement Set.

In various embodiments, the dynamic updating of the CoMP Measurement Set may allow the eNB 104 to adapt to changing network conditions, scheduling decisions, and/or location/needs of the UE 108.

Figure 4:
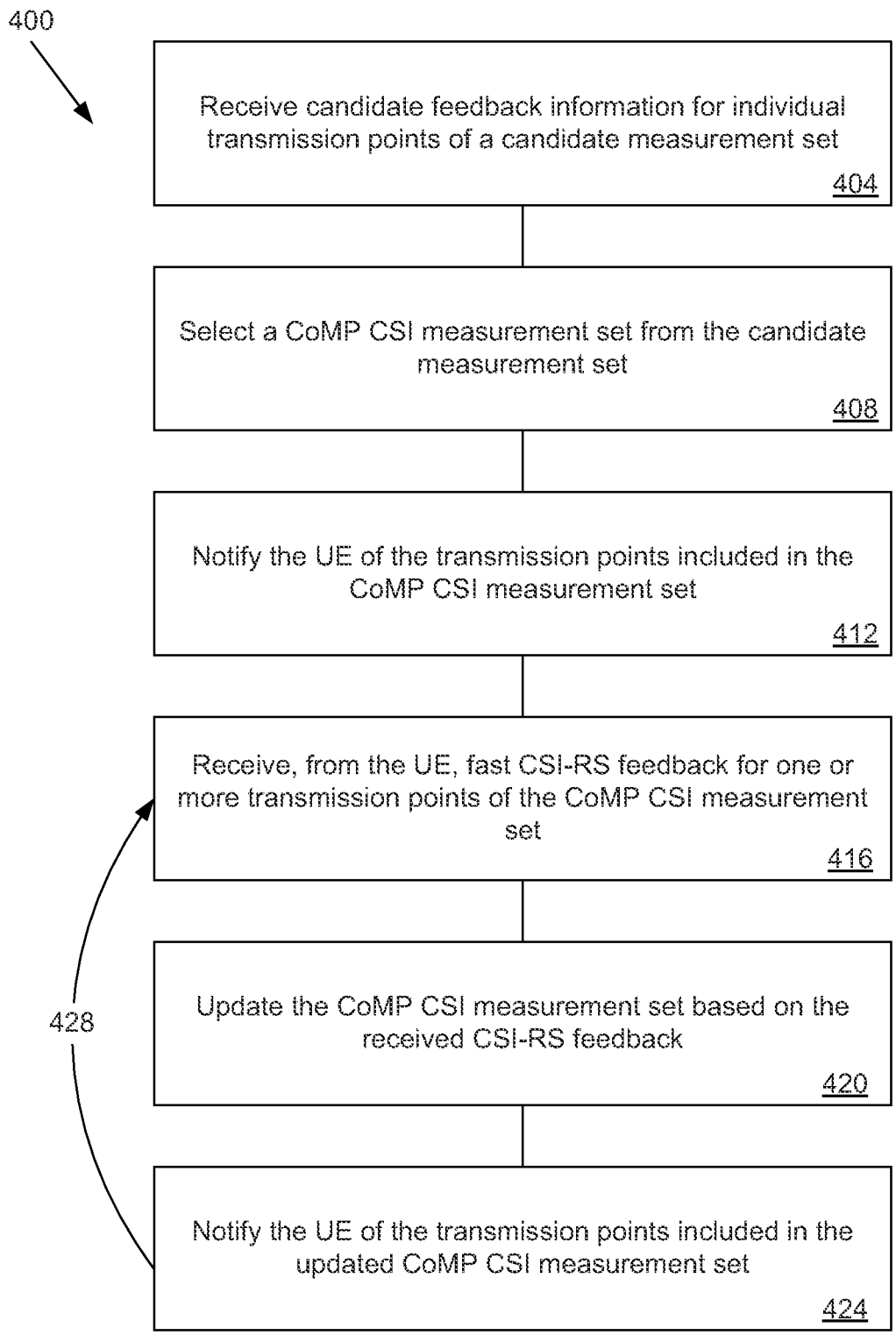
FIG. 4 is a flowchart illustrating a CoMP management method that may be performed by a base station in accordance with various embodiments.

FIG. 4 illustrates a method 400 of managing CoMP communications with a UE (e.g., UE 108) in accordance with various embodiments. Method 400 may be performed by an eNB, such as eNB 104. In some embodiments, the eNB may include and/or have access to one or more computer-readable media having instructions stored thereon, that, when executed, cause the eNB to perform the method 400.

At 404, the eNB may receive candidate feedback information for individual transmission points of a candidate measurement set. As discussed above, the candidate feedback information may include long-term CRS feedback information, uplink SRS feedback information, and/or long-term CSI-RS feedback information.

At 408, the eNB may select a CoMP Measurement Set from the candidate measurement set. At 412, the eNB may notify the UE of the transmission points included in the CoMP Measurement Set. For example, the eNB may send an RRC transmission and/or a MAC transmission to notify the UE of the transmission points included in the CoMP Measurement Set.

At 416, the eNB may receive, from the UE, fast CSI-RS feedback for one or more transmission points of the CoMP Measurement Set. In some embodiments, the number of transmission points in the CoMP Measurement set for which the UE transmits the fast CSI-RS feedback information may be further limited to a maximum of a predetermined number.

At 420, the eNB may update the CoMP Measurement Set based on the received CSI-RS feedback. The eNB may also take into account other data and/or factors. At 424, the eNB may notify the UE of the transmission points included in the updated CoMP Measurement Set. The method 400 may then start again at block 416 (as represented by an arrow 428). In other words, the eNB may receive fast CSI-RS feedback from the UE for one or more transmission points of the updated CoMP Measurement Set.

In various embodiments, the eNB may transmit CSI-RS parameters to the UE for the transmission points in the CoMP Measurement Set. In some embodiments, the eNB may transmit the CSI-RS parameters to the UE prior to block 404. For example, if the UE is to provide long-term CSI-RS feedback information as part of the candidate feedback information, then the eNB may transmit the CSI-RS parameters prior to block 404 to enable the UE to provide the long-term CSI-RS feedback information. In other embodiments, the eNB may transmit the CSI-RS parameters later in the method 400, such as in conjunction with notifying the UE of the CoMP Measurement Set at block 412.

In various embodiments, the eNB may select the cooperating set and scheduled transmission points set from the transmission points of the CoMP Measurement Set for which the eNB receives fast CSI-RS feedback at block 416.

Figure 5:
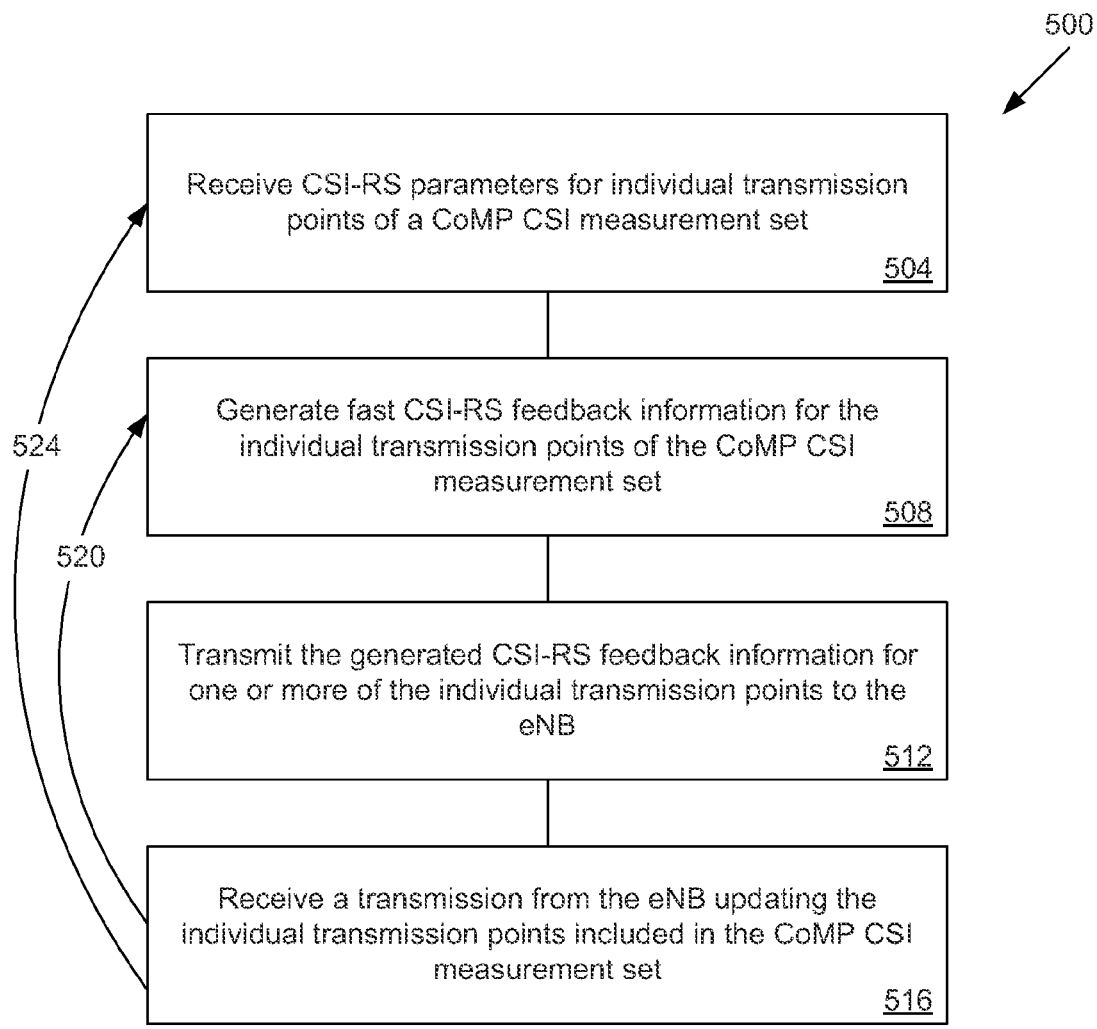
FIG. 5 is a flowchart illustrating a method for supporting CoMP configuration that may be performed by a user equipment in accordance with various embodiments.

FIG. 5 illustrates a method 500 that may be performed by a UE (e.g., UE 108) to assist the eNB in managing CoMP communications with the UE. In some embodiments, the UE may include and/or have access to one or more computer-readable media having instructions stored thereon, that, when executed, cause the UE to perform the method 500.

At 504, the UE may receive CSI-RS parameters for individual transmission points of a CoMP Measurement Set. In some embodiments, the CSI-RS parameters may be received for a larger group of transmission points (e.g., the CoMP Resource Management Set described above), and then the UE may receive a transmission notifying the UE of the transmission points included in the CoMP Measurement Set. In other embodiments, the CSI-RS parameters may be received along with and/or included in the transmission notifying the UE of the transmission points included in the CoMP Measurement Set.

At 508, the UE may generate fast CSI-RS feedback information for the transmission points of the CoMP Measurement Set. At 512, the UE may transmit the generated CSI-RS feedback for one or more of the transmission points to the eNB. In some embodiments, the number of transmission points for which the UE transmits the fast CSI-RS feedback information may be limited to a maximum of a predetermined number. The UE may receive the predetermined number from the eNB, for example, as part of the CSI-RS parameters.

At 516, the UE may receive a transmission from the eNB updating the individual transmission points included in the CoMP Measurement Set. In some embodiments, the UE may have previously received the CSI-RS parameters for all of the candidate transmission points that are candidates for inclusion in the CoMP Measurement Set. In that case, the UE may use the previously received CSI-RS parameters to generate the fast CSI-RS feedback for the updated CoMP Measurement Set. In other words, the UE may start method 500 again at block 508, as illustrated by arrow 520.

In other embodiments, the UE may not have the CSI-RS parameters for all of the transmission points in the updated CoMP Measurement Set. In that case, the UE may start method 500 again at block 504, as illustrated by arrow 524, and the UE may receive the CSI-RS parameters for the transmission points of the updated CoMP Measurement Set. The UE may receive only the CSI-RS parameters for the transmission points for which the UE has not previously received the CSI-RS parameters during the current session. Alternatively, the UE may receive the CSI-RS parameters for all transmission points of the updated CoMP Measurement Set when the method 500 repeats at block 504.

Figure 6:
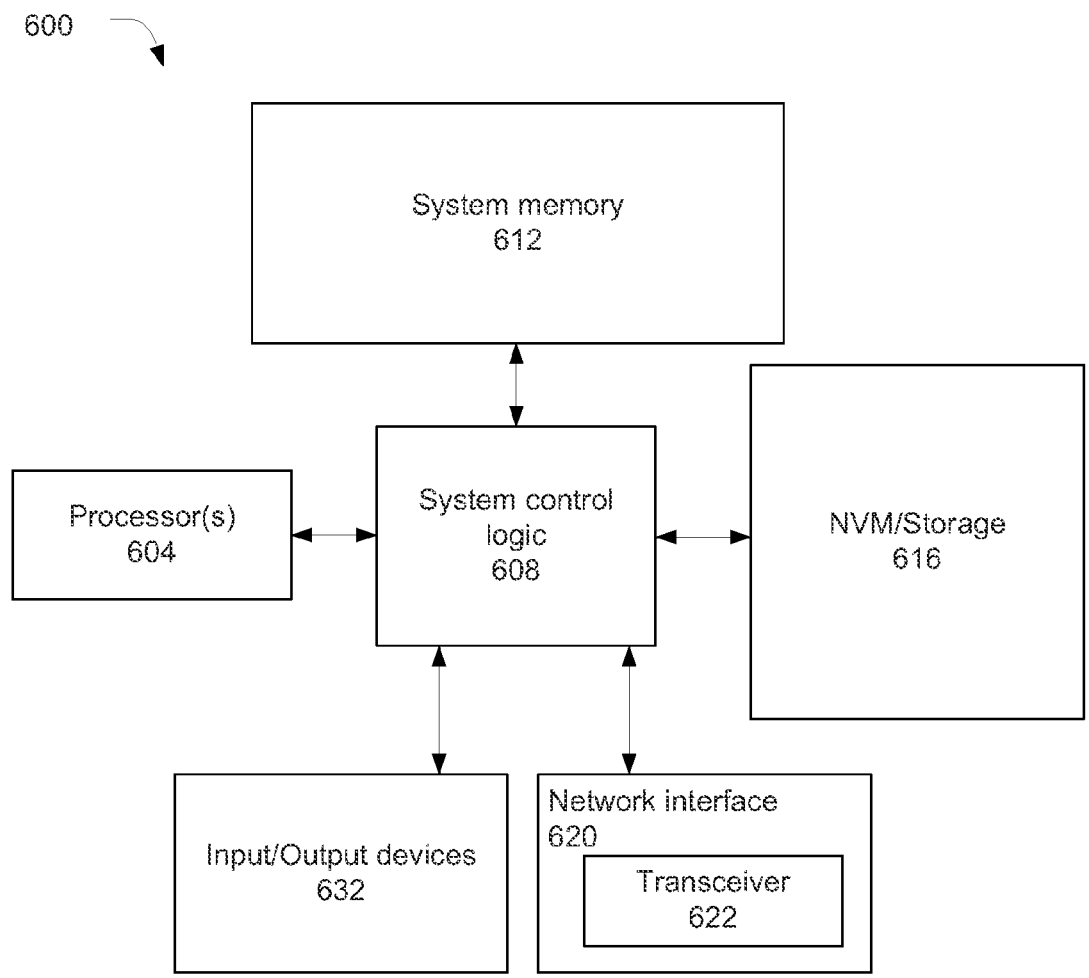
FIG. 6 is a block diagram illustrating an example system in accordance with various embodiments.

The eNB 104, UE 108, and/or transmission points 112 described herein may be implemented into a system using any suitable hardware and/or software to configure as desired. FIG. 6 illustrates, for one embodiment, an example system 600 comprising one or more processor(s) 604, system control logic 608 coupled with at least one of the processor(s) 604, system memory 612 coupled with system control logic 608, non-volatile memory (NVM)/storage 616 coupled with system control logic 608, a network interface 620 coupled with system control logic 608, and input/output (I/O) devices 632 coupled with system control logic 608.

The processor(s) 604 may include one or more single-core or multi-core processors. The processor(s) 604 may include any combination of general-purpose processors and dedicated processors (e.g., graphics processors, application processors, baseband processors, etc.).

System control logic 608 for one embodiment may include any suitable interface controllers to provide for any suitable interface to at least one of the processor(s) 604 and/or to any suitable device or component in communication with system control logic 608.

System control logic 608 for one embodiment may include one or more memory controller(s) to provide an interface to system memory 612. System memory 612 may be used to load and store data and/or instructions, for example, for system 600. System memory 612 for one embodiment may include any suitable volatile memory, such as suitable dynamic random access memory (DRAM), for example.

NVM/storage 616 may include one or more tangible, non-transitory computer-readable media used to store data and/or instructions, for example. NVM/storage 616 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 616 may include a storage resource physically part of a device on which the system 600 is installed or it may be accessible by, but not necessarily a part of, the device. For example, the NVM/storage 616 may be accessed over a network via the network interface 620 and/or over Input/Output (I/O) devices 632.

Network interface 620 may have a transceiver 622 to provide a radio interface for system 600 to communicate over one or more network(s) and/or with any other suitable device. The transceiver 622 may implement communications module 220. In various embodiments, the transceiver 622 may be integrated with other components of system 600. For example, the transceiver 622 may include a processor of the processor(s) 604, memory of the system memory 612, and NVM/Storage of NVM/Storage 616. Network interface 620 may include any suitable hardware and/or firmware. Network interface 620 may include a plurality of antennas to provide a multiple input, multiple output radio interface. Network interface 620 for one embodiment may include, for example, a wired network adapter, a wireless network adapter, a telephone modem, and/or a wireless modem.

For one embodiment, at least one of the processor(s) 604 may be packaged together with logic for one or more controller(s) of system control logic 608. For one embodiment, at least one of the processor(s) 604 may be packaged together with logic for one or more controllers of system control logic 608 to form a System in Package (SiP). For one embodiment, at least one of the processor(s) 604 may be integrated on the same die with logic for one or more controller(s) of system control logic 608. For one embodiment, at least one of the processor(s) 604 may be integrated on the same die with logic for one or more controller(s) of system control logic 608 to form a System on Chip (SoC).

In various embodiments, the I/O devices 632 may include user interfaces designed to enable user interaction with the system 600, peripheral component interfaces designed to enable peripheral component interaction with the system 600, and/or sensors designed to determine environmental conditions and/or location information related to the system 600.

In various embodiments, the user interfaces could include, but are not limited to, a display (e.g., a liquid crystal display, a touch screen display, etc.), a speaker, a microphone, one or more cameras (e.g., a still camera and/or a video camera), a flashlight (e.g., a light emitting diode flash), and a keyboard.

In various embodiments, the peripheral component interfaces may include, but are not limited to, a non-volatile memory port, a universal serial bus (USB) port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 620 to communicate with components of a positioning network, e.g., a global positioning system (GPS) satellite.

In various embodiments, the system 600 may be a mobile computing device such as, but not limited to, a laptop computing device, a tablet computing device, a netbook, a smartphone, etc. In various embodiments, system 600 may have more or less components, and/or different architectures.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. An apparatus to be employed by a user equipment (UE), the apparatus comprising:
   communications circuitry to communicate with an evolved Node B (eNB) over a wireless communications network;
   feedback circuitry coupled with the communications circuitry, the feedback circuitry to:
      receive, via cell-specific signaling, channel state information (CSI) reference signal (RS) parameters for individual transmission points of a coordinated multi-point (CoMP) Resource Management Set including a plurality of transmission points, wherein the CSI-RS parameters include a predetermined number;
      generate candidate feedback information for the individual transmission points of the CoMP Resource Management Set and transmit the candidate feedback information to the eNB via the communications circuitry;
      receive a first message, from the eNB via UE-specific signaling, to indicate individual transmission points of the CoMP Resource Management set that are included in a CoMP Measurement Set, wherein the first message includes a first bitmap, and wherein individual bits of the first bitmap correspond to respective individual transmission points of the CoMP Resource Management set to indicate whether the individual transmission point is included in the CoMP Measurement Set, and wherein the individual bits are ordered in the first bitmap according to indices corresponding to the individual transmission points;
      generate CSI-RS feedback information for the individual transmission points of the CoMP Measurement Set based on the received CSI-RS parameters, wherein the CSI-RS feedback information is different from the candidate feedback information;
      select a number transmission points of the CoMP Measurement Set based on quality of respective transmissions, wherein the number is less than or equal to the predetermined number;
      transmit the generated CSI-RS feedback information for the selected number of transmission points to the eNB via the communications circuitry; and
      receive a second message, from the eNB via UE specific signaling, including a second bitmap to update the individual transmission points included in the CoMP Measurement Set.

2. The apparatus of claim 1, wherein the feedback circuitry is further to provide candidate feedback information for individual transmission points of a candidate measurement set including a plurality of transmission points, wherein the CoMP Resource Management Set is a subset of the candidate measurement set, and wherein the eNB is to determine the CoMP Measurement Set based on the candidate feedback information.

3. The apparatus of claim 1, wherein the candidate feedback information includes long-term common reference signal (CRS) feedback information related to CRSs of individual transmission points, uplink sounding reference signals, and/or long-term CSI-RS feedback information related to CSI-RSs of individual transmission points.

4. The apparatus of claim 1, wherein the communications circuitry is further to:
  receive, from the eNB, a transmission indicating one or more transmission points that are scheduled to transmit to the UE on a physical downlink shared channel (PDSCH); and
  retrieve the CSI-RS parameters received for the corresponding transmission points during configuration of the CoMP Resource Management Set to receive transmissions on the PDSCH.

5. The UE of claim 1, wherein the CSI-RS parameters of the CoMP Resource Management Set are received via radio resource control (RRC) signaling, and wherein the first message includes a medium access control (MAC) control element (CE) that includes the first bitmap to indicate the individual transmission points of the CoMP Resource Management Set that are included in the CoMP Measurement Set.

6. The UE of claim 1, wherein the generated CSI-RS feedback information for individual transmission points is transmitted via a physical uplink control channel (PUCCH).

7. The UE of claim 1, wherein the generated CSI-RS feedback information for multiple transmission points is transmitted via a physical uplink shared channel (PUSCH) transmission.

8. The apparatus of claim 1, wherein the feedback circuitry is further to receive cell-specific reference signal (CRS) parameters for the individual transmission points of the CoMP Resource Management Set via the cell-specific signaling, and wherein the feedback circuitry is to generate the candidate feedback information based on the CRS parameters.

9. An apparatus to be employed by an evolved Node B (eNB) for managing coordinated multipoint (CoMP) communications on a wireless communications network, comprising:
  communications circuitry to communicate with a user equipment (UE) over the wireless communications network;
  CoMP management circuitry coupled to the communications circuitry, the CoMP management circuitry to:
    transmit, via cell-specific signaling, channel state information (CSI) reference signal (RS) parameters to the UE for individual transmission points of a CoMP Resource Management Set including a plurality of transmission points and a threshold number indicating a maximum quantity of transmission points for which the UE is to send fast CSI-RS feedback information;
    receive candidate feedback information for the individual transmission points of the CoMP Resource Management Set and transmit the candidate feedback information to the eNB via the communications circuitry;
    transmit a first message, to the UE via UE-specific signaling, to indicate individual transmission points of the CoMP Resource Management set that are included in a CoMP Measurement Set, wherein the first message includes a bitmap, and wherein individual bits of the bitmap correspond to respective individual transmission points of the CoMP Resource Management set to indicate whether the individual transmission point is included in the CoMP Measurement Set, and wherein the individual bits are ordered in the bitmap according to indices corresponding to the individual transmission points;
    receive, from the UE, fast CSI-RS feedback information for a number of the individual transmission points of the CoMP Measurement Set, wherein the number is less than or equal to the threshold number, and wherein the fast CSI-RS feedback information is based on the transmitted CSI-RS parameters and is different than the candidate feedback information; and
    update the individual transmission points included in the CoMP Measurement Set; and
    send a second message to notify the UE of the updated CoMP Measurement Set.

10. The apparatus of claim 9, wherein the CoMP management circuitry is further to:
  select the CSI measurement set from the CoMP Resource Management Set based on the candidate feedback information.

11. The apparatus of claim 9, wherein the candidate feedback information includes long-term common reference signal (CRS) feedback information, uplink sounding reference signal (SRS) feedback information, and/or long-term CSI-RS feedback information for individual transmission points of the CoMP Resource Management Set.

12. The apparatus of claim 9, wherein the CoMP management circuitry is further to notify the UE of one or more transmission points of the CSI measurement set that are scheduled to transmit to the UE on a physical downlink shared channel (PDSCH) based on indices corresponding to the transmission points.

13. A method for managing coordinated multipoint (CoMP) communications with a user equipment (UE), comprising:
  transmitting, to the UE via radio resource control (RRC) signaling, channel state information (CSI) reference signal (RS) parameters for individual transmission points of a coordinated multi-point (CoMP) Resource Management Set including a plurality of transmission points and a threshold number indicating a maximum quantity of transmission points for which the UE is to send CSI-RS fast feedback information;
  receiving, from the UE, candidate feedback information for the individual transmission points of the CoMP Resource Management Set;
  selecting a CoMP Measurement Set from the CoMP Resource Management Set;
  transmitting, to the UE a first medium access control (MAC) control element (CE) to indicate the transmission points of the CoMP Resource Management Set included in the CoMP measurement set, wherein the first MAC CE includes a bitmap, and wherein individual bits of the bitmap correspond to respective individual transmission points of the CoMP Resource Management set to indicate whether the individual transmission point is included in the CoMP Measurement Set, and wherein the individual bits are ordered in the bitmap according to indices corresponding to the individual transmission points;

receiving, from the UE, channel state information (CSI) reference signal (RS) fast feedback information for a number of the individual transmission points of the CoMP Measurement Set, wherein the number is less than or equal to the threshold number, and wherein the CSI-RS fast feedback information is based on the transmitted CSI-RS parameters and is different than the candidate feedback information; and updating the CoMP Measurement Set based on the received CSI-RS fast feedback information and the received candidate feedback information; and transmitting a second MAC CE to the UE to indicate the transmission points included in the updated CoMP Measurement Set.

14. The method of claim 13, wherein the CSI-RS parameters are transmitted to the UE as part of CoMP configuration parameters that further include cell-specific CoMP parameters for one or more cells associated with the transmission points.

15. The method of claim 13, wherein the candidate feedback information includes long-term common reference signal (CRS) feedback information, uplink sounding reference signal (SRS) feedback information, and/or long-term CSI-RS feedback information.

16. The method of claim 13, further comprising notifying the UE of a maximum number of the transmission points of the CoMP Measurement Set for which the UE is to provide the CSI-RS fast feedback information.

17. One or more non-transitory computer-readable media having instructions, stored thereon, that, when executed cause a user equipment (UE) to:

receive channel state information (CSI) reference signal (RS) parameters, from an evolved Node B (eNB) via radio resource control (RRC) signaling, for individual transmission points of a coordinated multi-point (CoMP) Resource Management Set including a plurality of transmission points, wherein the CSI-RS parameters include a threshold number to indicate a maximum quantity of transmission points for which the UE is to send CSI-RS fast feedback information;

receive a transmission, from the eNB, including a first medium access control (MAC) control element (CE) to indicate to the UE the individual transmission points of the CoMP Resource Management Set that are included in a CoMP Measurement Set, wherein the CoMP Measurement Set is a subset of the CoMP Resource Management Set, wherein the first MAC CE includes a bitmap, and wherein individual bits of the bitmap correspond to respective individual transmission points of the CoMP Resource Management set to indicate whether the individual transmission point is included in the CoMP Measurement Set, and wherein the individual bits are ordered in the bitmap according to indices corresponding to the individual transmission points;

generate candidate feedback information for the individual transmission points of the CoMP Resource Management Set and transmit the candidate feedback information to the eNB;

generate CSI-RS fast feedback information for the individual transmission points of the CoMP Measurement Set based on the CSI-RS parameters, wherein the CSI-RS fast feedback information is different than the candidate feedback information;

select a number transmission points of the CoMP Measurement Set based on quality of respective transmissions, wherein the number is less than or equal to the threshold number;

transmit the generated CSI-RS fast feedback information for the selected number of transmission points to the eNB; and receive a transmission from the eNB including a second MAC CE to update the individual transmission points included in the CoMP Measurement Set.

18. The one or more computer-readable media of claim 17, wherein two or more of the transmission points included in the CoMP Measurement Set have a same cell identification.

* * * * *